US011905148B2

(12) United States Patent
Mauthner

(10) Patent No.: US 11,905,148 B2
(45) Date of Patent: Feb. 20, 2024

(54) SNATCH BLOCK WITH SLIDE-OPEN SPRING-BIASED CHEEK, DUAL-PLUNGER LOCK RELEASE, AND INTEGRAL SWIVEL STUD

(71) Applicant: Basecamp Innovations Ltd., Invermere (CA)

(72) Inventor: Kirk M. Mauthner, Invermere (CA)

(73) Assignee: Basecamp Innovations Ltd, Invermere (CA)

( * ) Notice: Subject to any disclaimer, the term of this patent is extended or adjusted under 35 U.S.C. 154(b) by 164 days.

(21) Appl. No.: 17/551,714

(22) Filed: Dec. 15, 2021

(65) Prior Publication Data

US 2022/0250885 A1 Aug. 11, 2022

Related U.S. Application Data

(60) Provisional application No. 63/133,534, filed on Jan. 4, 2021.

(51) Int. Cl.
*B66D 3/00* (2006.01)
*B66D 3/04* (2006.01)

(52) U.S. Cl.
CPC .................................... *B66D 3/046* (2013.01)

(58) Field of Classification Search
CPC .................................. B66D 3/046; B66D 3/04
See application file for complete search history.

(56) References Cited

U.S. PATENT DOCUMENTS 516,268 A * 3/1894 Hartz ..................... B66D 3/046 254/405
733,239 A * 7/1903 Maddux ................. B66D 3/046 254/405
743,840 A * 11/1903 Eby ........................ B66D 3/046 254/406
773,741 A * 11/1904 Hilpert ................... B66D 3/046 254/406
811,191 A * 1/1906 Whiteside .............. B66D 3/046 254/412
942,274 A * 12/1909 Martin ................... B66D 3/046 254/405
1,135,740 A 4/1915 Thorp
(Continued)

FOREIGN PATENT DOCUMENTS

DE 1932480 2/1971
FR 2516064 A2 * 5/1983 ............. B66D 3/046

*Primary Examiner* — Emmanuel M Marcelo
(74) *Attorney, Agent, or Firm* — Kyle R. Satterthwaite; Ryan W. Dupius; Ade & Company Inc.

(57) ABSTRACT

A snatch block has a stationary first cheek and a movable second cheek that is slidable in its respective plane relative to the stationary first cheek. In a closed position, the second cheek connects with a crown jutting from the first cheek, thereby closing off a swallow of the snatch block. In an open position, an access gap opens into the swallow between the movable second cheek and the crown, thus enabling loading of a rope into the swallow. A locking mechanism with slide latches or rocker arms normally locks the second cheek in the closed position, and requires simultaneous actuation of two discretely separate releases to unlock the second cheek. The second cheek is biased into the open position, providing overt visual indication of any failed latching attempt. A seamlessly integral stud protrudes from the crown to rotatably support a swivel eye thereon.

21 Claims, 7 Drawing Sheets

(56) References Cited

U.S. PATENT DOCUMENTS

| | | | | | |
|---|---|---|---|---|---|
| 1,141,745 | A * | 6/1915 | Worrell | B66D 3/046 | 254/412 |
| 1,428,118 | A | 9/1922 | Robeson et al. | | |
| 1,766,357 | A * | 6/1930 | Robertson | B66C 1/34 | 254/405 |
| 2,235,302 | A * | 3/1941 | Stillwagon | B66D 3/046 | 254/405 |
| 2,262,328 | A * | 11/1941 | Mckissick | B66D 3/046 | 254/405 |
| 2,411,625 | A | 11/1946 | Jaques | | |
| 2,449,703 | A * | 9/1948 | Johnson | B66D 3/046 | 254/406 |
| 2,555,059 | A * | 5/1951 | Schrader | B66D 3/046 | 254/412 |
| 2,741,458 | A * | 4/1956 | Bus, Sr. | B66D 3/046 | 254/406 |
| 2,754,084 | A * | 7/1956 | Bus, Sr. | B66D 3/046 | 254/406 |
| 3,372,908 | A | 3/1968 | McCarthy | | |
| 3,999,739 | A * | 12/1976 | Vick | B66D 3/046 | 254/390 |
| 5,056,760 | A * | 10/1991 | Jorgensen | B66D 3/046 | 254/402 |
| 5,249,543 | A * | 10/1993 | Rutgerson | B66D 3/046 | 114/108 |
| 7,168,687 | B2 | 1/2007 | Thompson | | |
| 9,975,744 | B2 | 5/2018 | Groves | | |
| 10,995,842 | B1 | 5/2021 | Siemer et al. | | |
| 2006/0091369 | A1* | 5/2006 | Thompson | A63B 29/02 | 254/406 |
| 2015/0298945 | A1 | 10/2015 | Fayal | | |
| 2020/0031638 | A1 | 1/2020 | Chabod | | |
| 2021/0087028 | A1 | 3/2021 | Bonnet | | |

* cited by examiner

FIG. 13
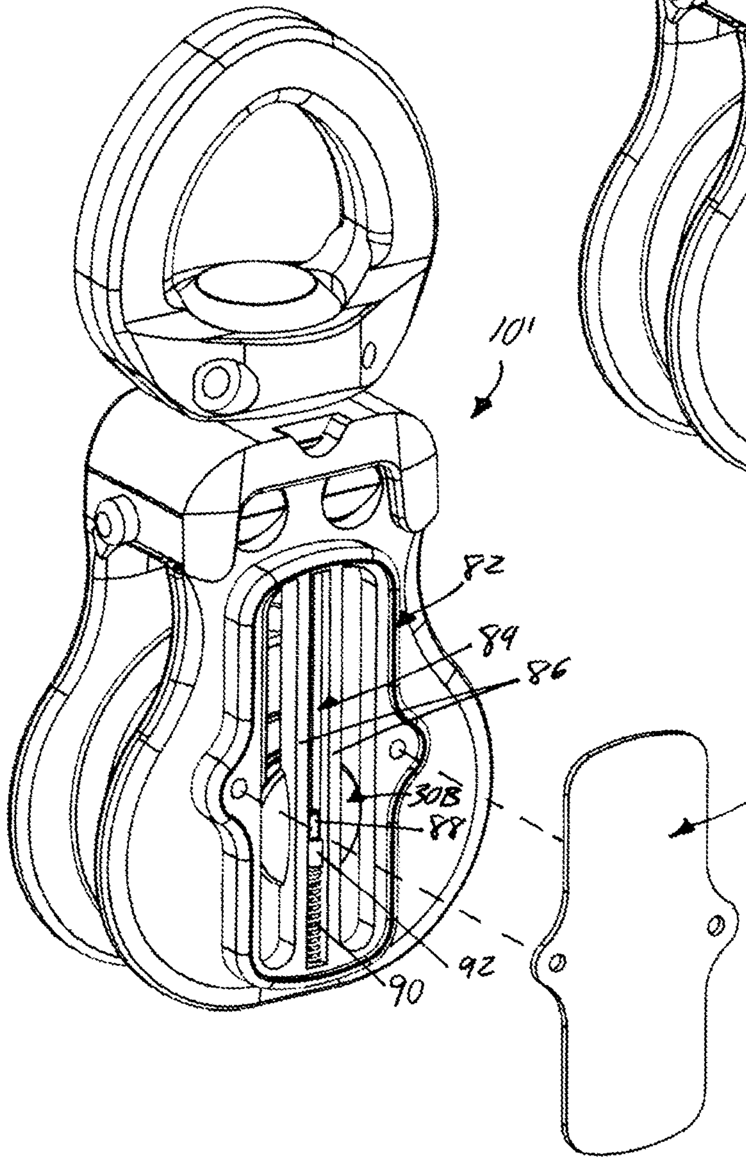
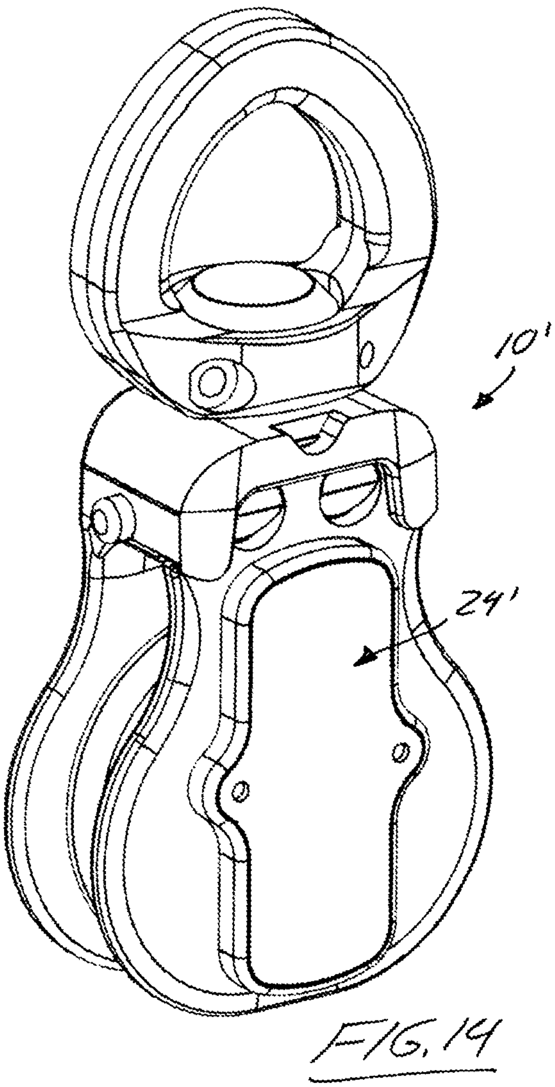
FIG. 14

SNATCH BLOCK WITH SLIDE-OPEN SPRING-BIASED CHEEK, DUAL-PLUNGER LOCK RELEASE, AND INTEGRAL SWIVEL STUD

CROSS-REFERENCE TO RELATED APPLICATIONS

This application claims foreign priority benefit under 35 U.S.C. 119(e) of U.S. Provisional Patent Application 63/133,534, filed Jan. 4, 2021, the entirety of which is incorporated herein by reference.

FIELD OF THE INVENTION

The present invention relates generally to pulleys, and more particularly to snatch blocks whose shells are selectively openable/closeable at one side to enable side-loading of a rope into a swallow of the snatch block, rather than requiring end-wise feeding of the rope thereinto.

BACKGROUND

Pulleys, come in many forms, shapes, sizes and capacities. In a general sense, they are all similar in that they contain one or more wheels, or more technically, sheaves, for which to run ropes, lines or cables around. A shell of the pulley supports and contains the one or more sheaves, and also carries an attachment point for the purpose of connecting the pulley to a suitable anchor.

Design variations among different types of pulleys include the manner in which the ropes are loaded into working positions wrapping around the sheaves of the pulleys. One type of pulley is referred to as a snatch block, and is characterized by the ability to selectively open up an access gap at one side of the shell, whereby a intermediate segment of rope situated anywhere along the rope's length can be side-loaded into the pulley, rather than having to feed a free end of the rope into the pulley. Some snatch block designs require fasteners or pins to be removed then reinstalled after the rope has been inserted.

In other snatch block designs, one of the two outer cheeks or side plates that neighbour the sheave(s) on opposing sides thereof is selectively rotatable into an open position creating an access gap between the rotated cheek and a top crown of the shell, to which a separate swivel is bolted. U.S. Pat. No. 7,168,687 shows an example of such a snatch block with a rotatably opened cheek plate, which is normally locked in a closed position engaged to the swivel-equipped crown by a single spring-loaded latch button that engages with a corresponding latch opening in the rotatable cheek.

In another style of openable/closeable pulley that permits loading of an intermediate rope segment, the two cheek plates have parallel lower support portions between which the sheave is rotatably supported, angled intermediate portions that converge toward one another above the sheave, and parallel upper contact portions that normally reside in closely adjacent relationship and thereby effectively form a closed crown of the shell. One or more aligned openings in these upper contact portions allow connection of one or more carabiners thereto. However, absent any such carabiner, the cheeks are rotatable relative to one another into angularly spread positions about the sheave axis, enabling loading of an intermediate rope segment onto the sheave. One example of this pulley type is the Rock Exotica Kootenay Ultra pulley.

In addition to such openable/closeable pulleys, other pulley designs have a rigidly fixed shell of permanently closed configuration, thus requiring the end of the rope to be threaded through the pulley, and preventing any possible side-loading of an intermediate rope segment onto the sheave.

Despite the existence of the forgoing different types of openable/closeable pulleys, there remains room for improvements and alternatives, particularly in terms of how the pulley is opened and closed to permit loading of intermediate rope segments, and in terms of how the pulley is securely locked in the closed state to prevent inadvertent opening during use.

SUMMARY OF THE INVENTION

According to a first aspect of the invention, there is provided a snatch block comprising:

- a stationary first cheek residing in a first plane on a first side of an internal space of the snatch block;
- a movable second cheek residing in a second plane on an opposing second side of an internal space of the snatch block in spaced and opposing relation to said first cheek, said second cheek being slidable back and forth in said second plane between a closed position and an open position;
- a sheave rotatably supported on said first and second cheeks in the internal space therebetween, and said sheave being rotatable around a rotation axis that transversely penetrates said first and second planes; and
- a crown attached to the stationary first cheek and jutting inwardly therefrom toward the second plane at a position spaced outwardly from a periphery of the sheave in a radial direction relative to said rotation axis, thereby delimiting a swallow that remains open between the sheave and the crown to accommodate passage of a rope therethrough;
- wherein said movable second cheek is slidable, relative to the first cheek, between the closed position, in which the second cheek connects with the crown and closes off the swallow at the second side of the interior space, and the open position, in which an access gap opens into the swallow between the movable second cheek and the crown at the second side of the interior space to enable loading of the rope into the swallow via said access gap According to a second aspect of the invention, there is provided a snatch block comprising:

a first stationary cheek residing in a first plane on a first side of an internal space of the snatch block;

- a movable second cheek residing in a second plane on an opposing second side of an internal space of the snatch block in spaced and opposing relation to said stationary first cheek, said movable second cheek being movable between a closed position and an open position;
- a sheave rotatably supported on said first and second cheeks in the internal space therebetween, and said sheave being rotatable around a rotation axis that transversely penetrates said first and second planes; and
- a crown residing at a position spaced outwardly from a periphery of the sheave in a radial direction relative to said rotation axis, thereby delimiting a swallow that remains open between the sheave and the crown to accommodate passage of a rope therethrough;
- wherein:
  - said movable second cheek is movable, relative to the stationary first cheek, between the closed position, in which the movable second cheek closes off the swallow at the second side of the interior space, and the open position, in which an access gap opens into the swallow to enable loading of the rope into the swallow via said access gap; and a dual-release locking mechanism that is configured to normally lock the movable second cheek in the closed position, and comprises two separately actuated releases that reside at discretely separate locations on the snatch block and require physical exertion of separate actuation forces thereon to release said dual-release locking mechanism.

In one embodiment, each release comprises a depressible release plunger engaged with a respective slidable latch, said slidable latch being normally biased into a locking position engaged to the movable second cheek, and being selectively displaceable into a release position disengaged from the movable second cheek upon depression of the release plunger.

In another embodiment, each release is embodied by a release portion of a respective rocker arm that also has a latching portion configured for engagement with the movable second cheek, and depression of said release portion of the rocker arm is operable to pivot said rocker arm in a direction disengaging the latching portion thereof from the movable second cheek.

According to a third aspect of the invention, there is provided a device comprising:

first cheek residing in a first plane on a first side of an internal space of the device through which routing of a rope is accommodated;

a second cheek residing in spaced and opposing relation to the first cheek in a second plane residing across the internal space therefrom;

a crown attached to at least one of the cheeks and jutting therefrom toward the other cheek at a position crowning said internal space;

a seamlessly integral stud protruding from the crown at a topside thereof that faces outwardly away from the internal space; and a swivel eye rotatably coupled to said stud for swivelling movement around a stud axis thereof.

According to a fourth aspect of the invention, there is provided a snatch block comprising:

a first stationary cheek residing in a first plane on a first side of an internal space of the snatch block;

a movable second cheek residing in a second plane on an opposing second side of an internal space of the snatch block in spaced and opposing relation to said stationary first cheek, said movable second cheek being movable between a closed position and an open position;

at least one sheave rotatably supported on said first and second cheeks in the internal space therebetween, and said sheave being rotatable around a rotation axis that transversely penetrates said first and second planes; and a crown residing at a position spaced outwardly from a periphery of the sheave in a radial direction relative to said rotation axis, thereby delimiting a swallow that remains open between the sheave and the crown to accommodate passage of a rope therethrough;

wherein the movable second cheek is spring biased into the open position.

BRIEF DESCRIPTION OF THE DRAWINGS

Preferred embodiments of the invention will now be described in conjunction with the accompanying drawings in which:

FIG. 13 is a front perspective view of a snatch block according to a second embodiment of the present invention, in which the movable cheek plate is spring biased into the open position.

FIG. 14 is a partially exploded front perspective view of the snatch block of FIG. 13 with the protective cover thereof removed to reveal a spring by which the movable cheek plate is biased into the open position.

DETAILED DESCRIPTION

Figure 1:
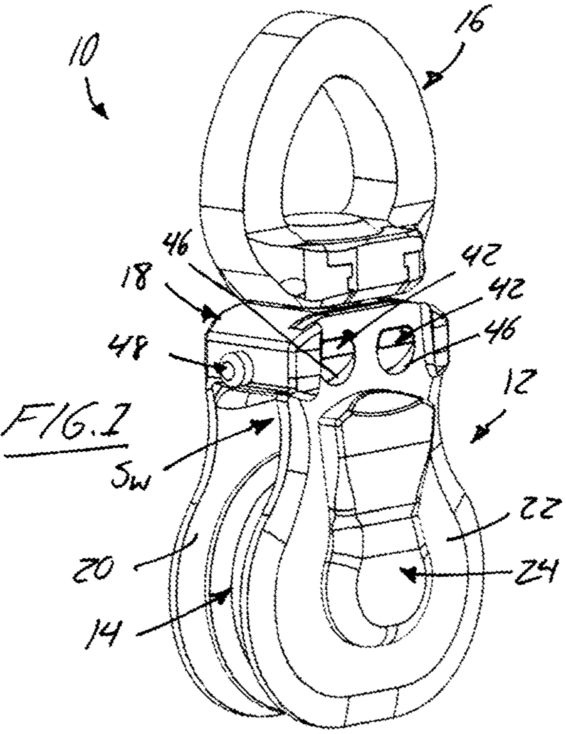
FIG. 1 is a front perspective view of a snatch block according to a first embodiment of the present invention, shown with a movable cheek plate thereof locked in a closed position.
Figure 2:
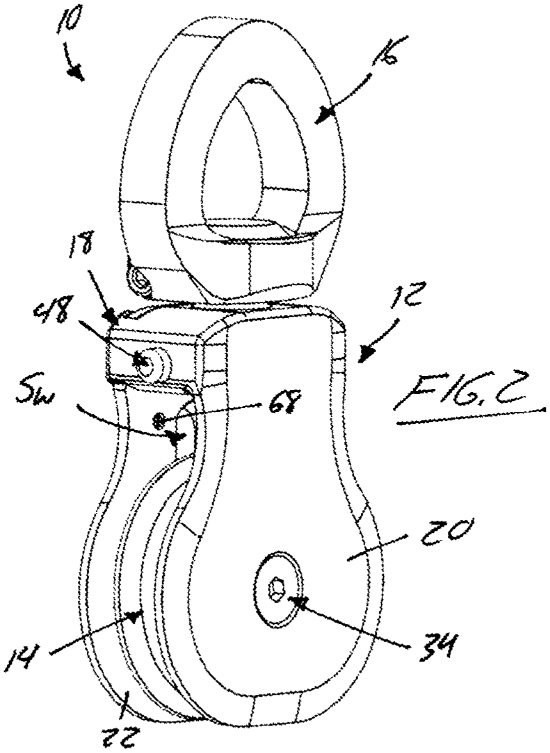
FIG. 2 is a rear respective view of the snatch block of FIG. 1.
Figure 3:
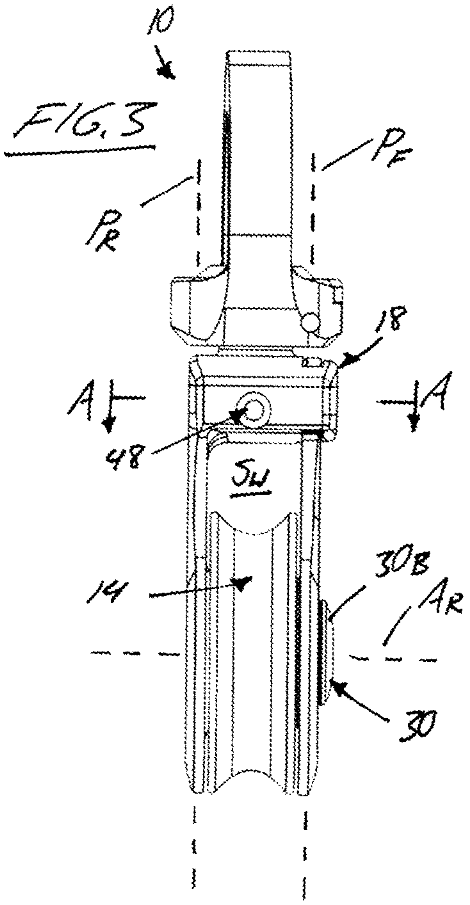
FIG. 3 is a side view of the snatch block of FIG. 1, with a protective cover thereof removed.
Figure 4:
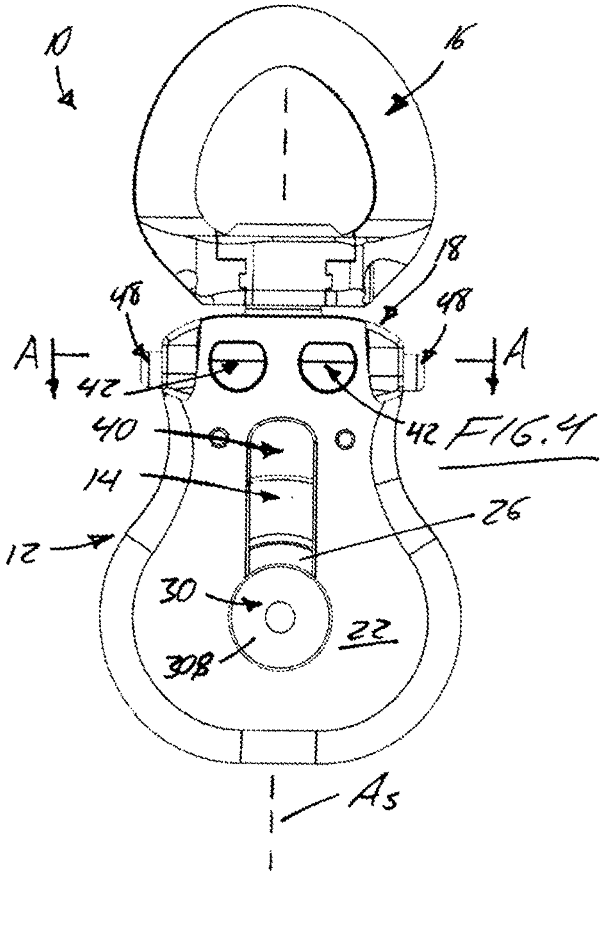
FIG. 4 is an elevational front view of the snatch block of FIG. 3.

FIGS. 1 and 2 show a fully assembled snatch block 10 of the present invention in a closed condition and locked state, thus reflecting how it would appear when being used on a rope. Generally, the snatch block 10 comprises a shell 12 delimiting an interior space of the snatch block, a sheave 14 rotatably supported on the shell within the interior space thereof, and a swivel eye 16 rotatably coupled to a crown 18 of the shell 12 at a top end thereof. The shell 12 features a first stationary cheek plate 20 residing in a respective first plane on a first side of the sheave 14, and a second movable cheek plate 22 residing in a respective second plane on an opposing second side of the sheave 14. The crown 18 is affixed to the stationary cheek plate 20 at a top end thereof, and resembles a shoulder that juts inwardly from the stationary cheek plate 20 at an inner side thereof toward the opposing movable cheek plate 22. With reference to the illustrated orientation of the snatch block, the first and second cheek plates 20, 22 reside in vertical planes $P_F$, $P_R$ at front and rear sides of the snatch block, respectively. The term "lateral sides" is used herein to refer to the two remaining sides of the snatch block's four different sides. The lateral sides thus oppose one another in a direction that's perpendicular to a direction in which the front and rear sides of the snatch block oppose one another. In FIG. 1, the movable cheek 22 has a protective cover 24 mounted on an outer side thereof, i.e. the side thereof situated oppositely of the sheave 14, and facing away therefrom. In the other figures, protective cover 24 is removed to reveal other structural details of the snatch block that would otherwise be obstructed by the installed position of the cover 24.

Figure 9:
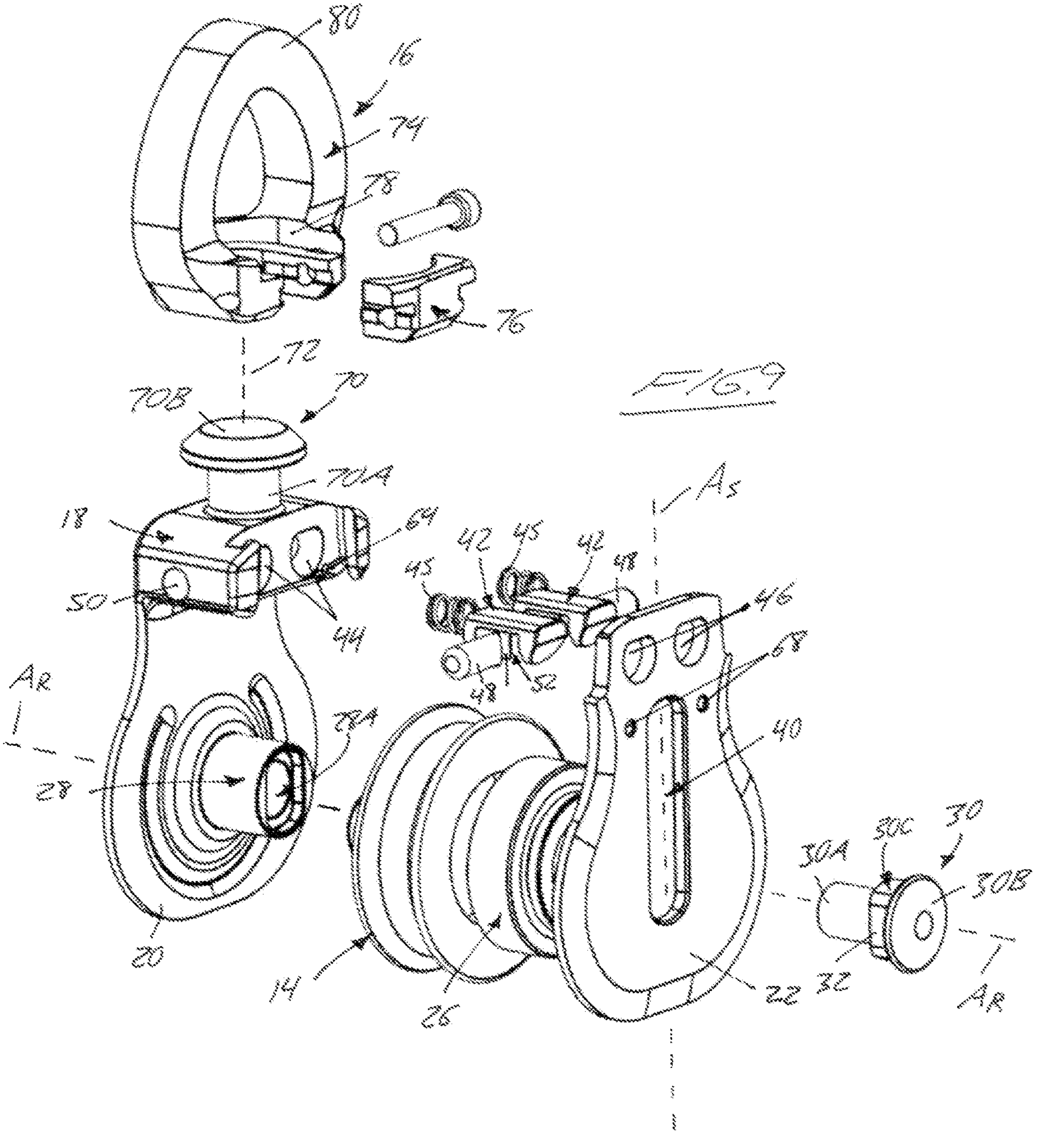
FIG. 9 is an exploded view of the snatch block of FIGS. 3 and 4.
Figure 10:
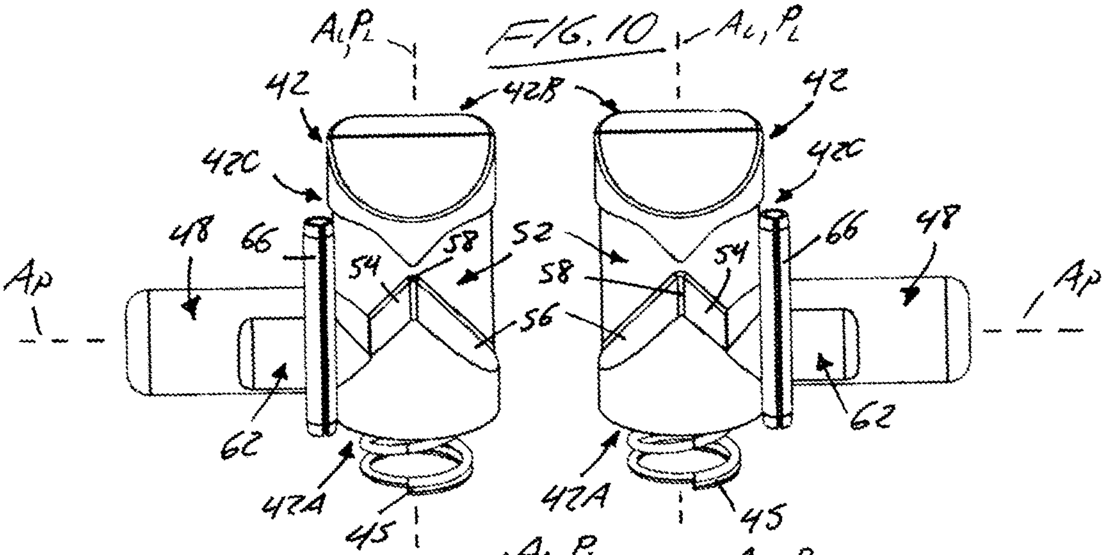
FIG. 10 is a bottom perspective view of a locking mechanism of the snatch block, shown in isolation.
Figure 11:
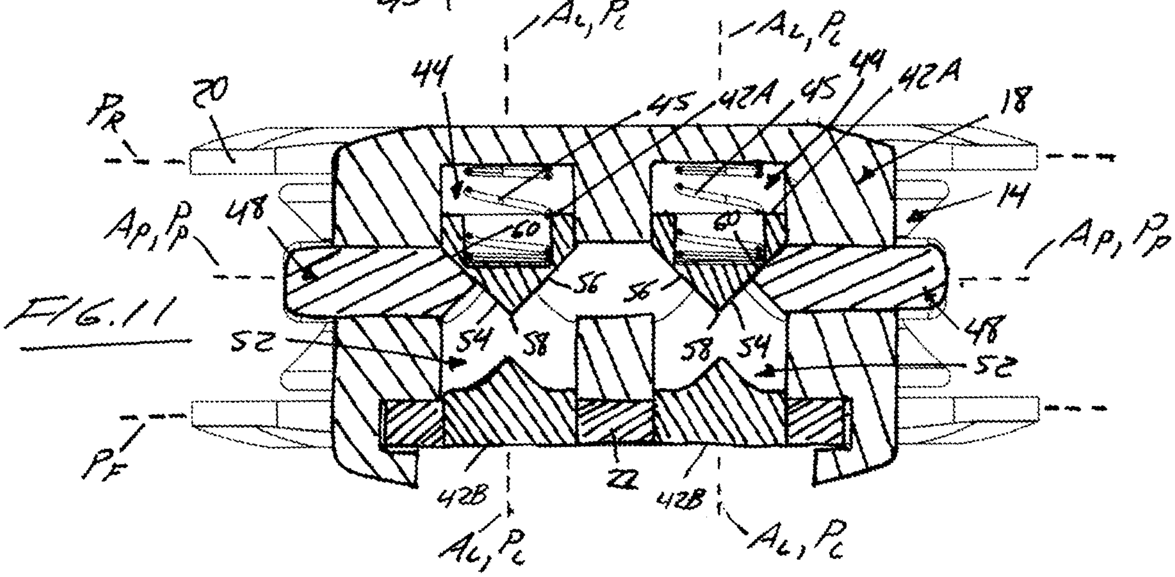
FIG. 11 is a cross-sectional view of the snatch block of FIGS. 3 and 4, as viewed along line A-A thereof to illustrate a locking position of the locking mechanism.

The sheave 14 is rotatable about a rotation axis $A_R$ that perpendicularly intersects the planes $P_F$, $P_R$ of the two cheek plates 20, 22. The rotation axis $A_R$ is defined by an axle assembly that spans between the two cheek plates 20, 22, and on which the sheave 14 is rotatably mounted, for example by an internal bearing 26 of the sheave 14. In the illustrated example, the axle assembly features a hollow axle sleeve 28 that is affixed to and projects perpendicularly from the inner side of the stationary cheek plate 20, as best shown in FIG. 9, and a mating axle pin 30. The axle pin 30 has a shaft 30A that is inserted into an internal bore of the axle sleeve 28 through a female opening 28A at a distal end of the axle sleeve furthest from the stationary cheek plate 20. The internal bore of the axle sleeve 28 is a through-bore that penetrates all the way through the sleeve 28, and onwardly through the stationary cheek plate 20. The axle pin 30 has an enlarged head 30B at an external end thereof that resides outside the shell 12 of the snatch block 10 at the outer side of the movable cheek plate 22. The axle pin 30 also has a transition shoulder 30C that joins the enlarged head 30B to the shaft 30A of the pin. The transition shoulder 30C has a width that exceeds the diameter of the male shaft 30A, but that is less than the diameter of the enlarged head 30B. The outer periphery of the transition shoulder 30C has flat, parallel facets 32 at opposing sides thereof, and the width of the transition shoulder refers to the distance measured between these two facets 32. The shaft 30A of the axle pin 30 in internally threaded, and is secured inside the axle sleeve 28 by a threaded axle fastener 34, which is inserted into the through-bore of the axle sleeve 28 from the outer side of the stationary cheek plate 20, as best seen in FIG. 2.

Referring to FIG. 9, the internal bearing 26 of the sheave 14 is journaled on the outer axle sleeve 28 in order to rotatably carry the sheave 14 thereon. The sheave 14 is thereby rotatable about the rotation axis $A_R$ on which the axle sleeve 28, axle pin 30 and axle fastener 34 are coaxial with one another. The movable cheek plate 22 has an elongated slot 40 therein running vertically thereof on a slot axis $A_S$ that lies perpendicularly of the rotation axis $A_R$ in the plane $P_F$ of the movable cheek plate 22. The width of the slot 40 only slightly exceeds the width of the axle pin's transition shoulder 30C, which is received in the slot 40. The parallel facets 32 of the transition shoulder 30C reside respectively adjacent the two vertically elongated sides of the slot 40, thus preventing any relative rotation between the movable cheek plate 22 and the axle pin 30. The axial thickness of the transition shoulder 30C exceeds the thickness of the movable cheek plate 22, whereby the transition shoulder 30C passes fully through the slot 40, and extends past the inner side of the movable cheek plate 22. The female opening 28A at the distal end of the axle sleeve 28 includes a counterbore of matching flat-sided shape to the transition shoulder 30C. The counterbored distal end of the axle sleeve 28 thus forms a socket for mated receipt of the portion of the transition shoulder 30C that protrudes inwardly from the inner side of the movable cheek plate 22. The matching flat sides of the transition shoulder and the counterbored receiving socket cooperate to prevent any relative rotation between the axle pin 30 and the axle sleeve 28 when mated together. Accordingly, both the axle pin 30 and the movable cheek plate 22 are both held in non-rotatable relation to the rotation axis $A_R$ of the sheave 14.

While rotationally fixed, the movable cheek plate 24 is linearly slidable, within its respective plane $P_F$, in back and forth fashion along the slot axis $A_S$. The movable cheek plate 24 is thus slidable up and down relative to both the stationary cheek plate 20 and the shoulder-like crown 18 affixed thereto. It is through such sliding movement of the movable cheek plate 22, in cross-wise relation to the rotation axis $A_R$, that the novel snatch block 10 is opened and closed at the front side thereof to enable side-loading of an intermediate rope segment into the snatch block from the front side thereof, when opened.

Figure 5:
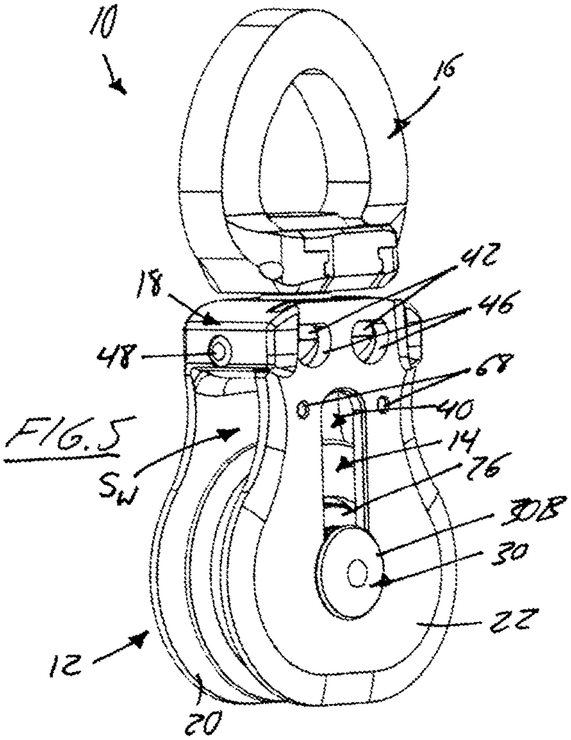
FIG. 5 is a front perspective view of the snatch block of FIG. 4, with the movable front cheek plate still in the closed condition, but in an unlocked state.
Figure 6:
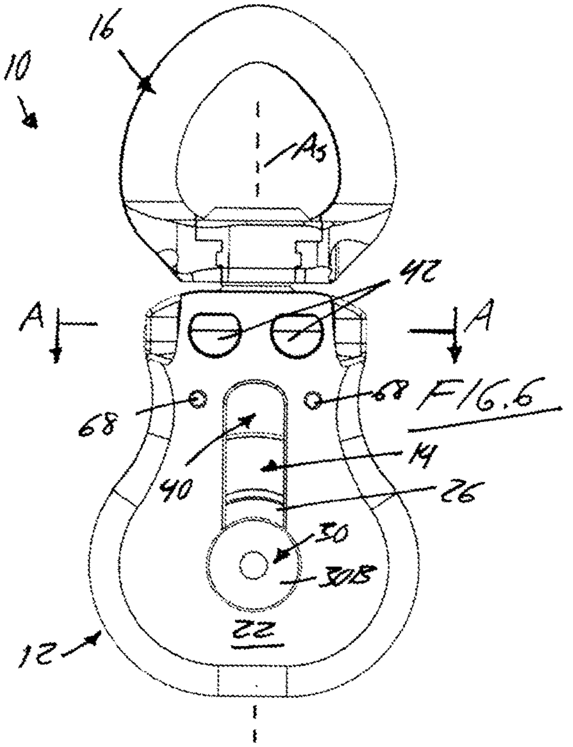
FIG. 6 is a front elevational view of the snatch block of FIG. 5.
Figure 7:
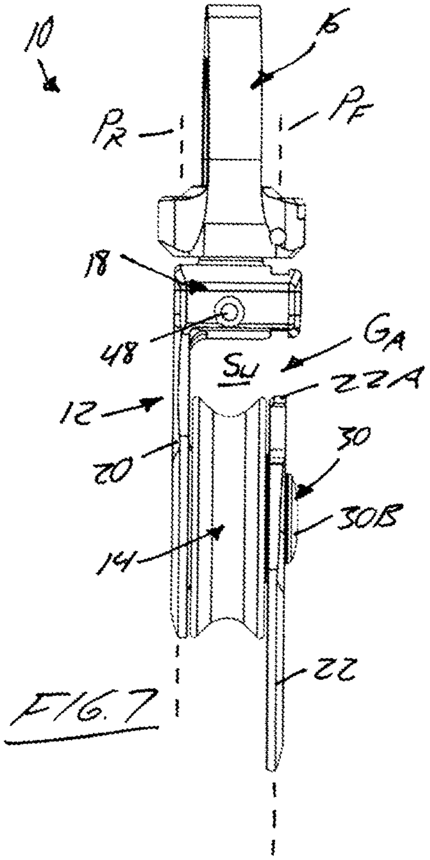
FIG. 7 is a side view of the snatch block of FIG. 1, but with the movable cheek plate in an open position.
Figure 8:
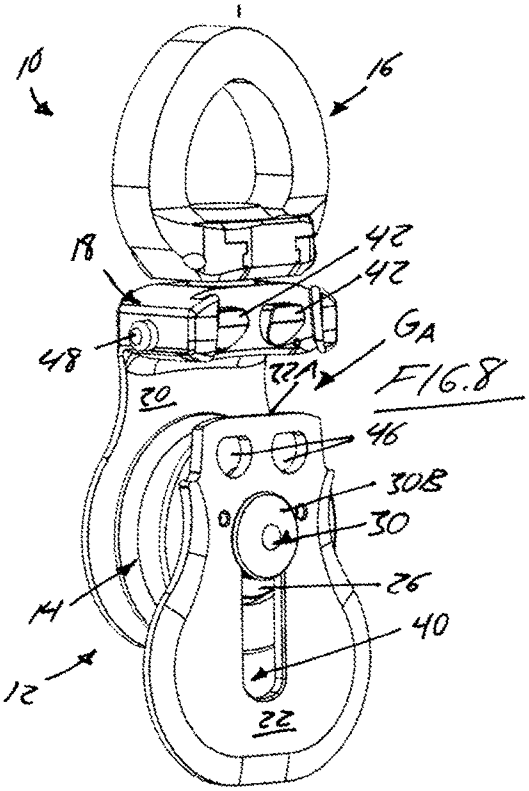
FIG. 8 is a front perspective view of the snatch block of FIG. 7.

FIGS. 1 to 6 show the movable cheek plate 22 in its closed position raised up into coupled engagement with the crown 18, and secured thereto by a locking mechanism, disclosed in more detail below. FIGS. 7 and 8 show the movable cheek plate 22 its open position lowered away from the crown 18 in order to open up an access gap G between the crown 18 and a terminal upper edge 22A of the movable cheek plate 22. The open position of the movable cheek plate 22, and the access gap G revealed thereby, enables access to the interior space of the shell 12. This interior space is delimited between the inner sides of the two cheek plates 20, 22, and is only partially occupied by the sheave 14. More specifically, the access gap $G_A$ enables access to an upper subregion of the interior space that is vertically delimited between the crown 18 and the periphery of the sheave 14. This upper subregion of the interior space is where a rope is routed over the sheave during use of the snatch block, and is referred to herein as a swallow $S_W$ of the snatch block. In the closed position of the movable cheek plate 22, both sides of the swallow $S_W$ are fully and respectively closed by the two cheek plates 20, 22, whereas in the open position of the movable cheek plate 22, one side of the swallow is open at the revealed access gap $G_A$. This opened access gap $G_A$ enables side-loading of an intermediate rope segment into the swallow $S_W$, rather than requiring endwise feeding of the rope into the swallow from one of snatch block's two lateral sides. The slidable opening of the snatch block thus provides a structurally and functionally distinct alternative to the rotationally opened snatch blocks of the prior art.

To normally lock the movable cheek plate 22 in the closed position, a novel locking mechanism is employed. This locking mechanism requires manual exertion of two separate actuation forces performed at two discretely separate locations on the snatch block in order to release the movable cheek plate from its normally locked state, thereby offering improved safety over locking devices that require only a singular user-input action.

The locking mechanism features two sliding latch bolts 42, each of which is slidably received in a respective one of two latch bores 44 that penetrate into the crown 18 from the front side of the snatch block. Each latch bore 44 is closed at a proximal end thereof nearest the plane $P_R$ of the stationary cheek plate 20, but is open at an opposing distal end of the bore 44 nearest to the plane $P_F$ of the movable cheek plate 22. The movable cheek plate 22 has a pair of latch openings 46 therein at an elevation near, but spaced slightly below, the terminal top edge 22A thereof. In the closed position of the movable cheek plate 22, the two latch openings 46 therein align with the two latch bores 44 in the crown 18. A proximal end 42A of each latch bolt 42 that faces the closed proximal end of the respective latch bore 44 has a round spring cavity recessed axially into the latch bolt 42 for the purpose of receiving one end of a respective compression spring 45, whose opposing end is abuts against the closed proximal end of the latch bore 44. The two springs 45 thus bias the two latch bolts 42 into locking positions protruding outwardly from the open distal ends of the two latch bores 44, whereby the two latch bolts 42 automatically engage into the latch openings 46 of the movable cheek plate 22 when slid into its closed position.

In the first and second illustrated embodiments, neither latch bolt 42 projects fully through the respective latch opening 46 in the locking position, whereby a distal end 42B of each latch bolt 42 resides entirely within the respective latch opening 46 in the locking position, and no part of either latch bolt protrudes from the outer side of the movable cheek plate 22. This helps prevent either latch bolt from being inadvertently pushed further into its respective latch bore and into a release position disengaged from the movable cheek plate 22. For the purpose of retracting the latch bolts 42 into such release positions, two release plungers 48 are each engaged with a respective one of the two latch bolts 42. Each release plunger 48 is received in a respective plunger bore 50 that penetrates into the crown 18 from a respective one of the two lateral sides of the snatch block, and perpendicularly intersects with a respective nearest one of the latch bores 44. One such plunger bore 50 is visible in the exploded view of FIG. 9, and the other plunger bore is similarly or equally positioned at the opposing lateral side of the snatch block. The plunger bores 50 lie on parallel, and preferably coincident, plunger axes $A_P$ that are oriented parallel to the planes $P_F$, $P_R$ of the cheek plates 20, 22, and perpendicularly crosswise to the two latch bores 44. The two latch bores 44, and the two latch bolts 42 received therein, lie on parallel non-coincident latch axes $A_L$ that are parallel to the rotation axis $A_R$ of the sheave 14.

Each latch bolt 42 has an actuation cavity 52 therein that is recessed into an underside thereof, and that penetrates laterally through the latch bolt 42 from one side thereof to the other in the axial direction of the plunger bores 50. A proximal end of the actuation cavity nearest to the spring-loaded proximal end 42A of the latch bolt is characterized by a bolt contact surface 54 of planar character that is oriented obliquely to both the latch axis $A_L$ of the latch bolt 42 and the plunger axis $A_P$ of the respective release plunger 48. From an outer side 42C of each latch bolt that faces toward the nearest lateral side of the snatch block, and away from the other latch bolt, this bolt contact surface 54 angles toward the distal end 42B of the latch bolt 42, and terminates at a bisecting midplane $P_L$ of the latch bolt that lies axially thereof and parallel to the slot axis $A_S$. In the illustrated first and second embodiments, each latch bolt 42 is symmetric across its midplane $P_L$, whereby the proximal end of the actuation cavity has a peaked shape at which a second oblique and planar bolt surface 56 intersects the bolt contact surface 54 at the midplane $P_L$ of the latch bolt 42. The intersection of the two obliquely angled bolt surfaces 54, 56 thus forms a central peak 58 that points toward the distal end 42B of the latch bolt 42. This symmetric design enables use of two identical latch bolts 42, each of whose respective contact surface 54 is engaged by a respective one of the two release plungers 48 for the purpose of actuating the lock bolt from its default locking position to its retracted release position. It will be appreciated however that two identical latch bolts of symmetric shape need not necessarily be employed.

Each release plunger 48 is likewise preferably, though optionally, symmetric about an axially oriented midplane. The illustrated plungers 48 thus each have a pointed working end that, like the proximal end of each latch bolt's actuation cavity 52, has a peaked shape formed of two intersecting planar surfaces that lie symmetrically oblique to, and intersect at, a bisecting midplane $P_P$ of the release plunger 48. One of these surfaces forms a plunger contact surface 60 that lies parallel to, and in flush abutting contact with, the bolt contact surface 54 of the respective latch bolt 42. The bolt contact surfaces 54 and plunger contact surfaces 60, being at oblique orientations to both the plunger and bolt axes, are in slidable interface with one another so that movement of each latch bolt and its respective plunger on these orthogonal axes are interrelated. Axial displacement of the plunger 48 further into its respective plunger bore 50, induced by manual depression of the exposed external end of the plunger that resides outside the crown 18, acts to drive axial displacement of the respective latch bolt 42 further into its respective latch bore 44 toward the closed proximal end thereof, against the bias of the respective spring. Such depression of the release plunger 48 thereby moves the latch bolt 42 into its release position disengaged from the respective latch opening 46 in the movable cheek plate 22. On the flip side, under removal of the manually exerted depression force on the displacement plunger 48, the spring force of the compression spring 45 displaces the latch bolt 42 further out from its respective latch bore 44 and back into the locking position, during which the sliding interface between the bolt and plunger contact surfaces 54, 60 drives the plunger 48 further out from its plunger bore. The spring-biased return of the latch bolt 42 to its default locking position thus automatically drives the release plunger from its manually depressed position, back into its default ready position protruding further outward from the lateral side of the crown 18.

Figure 12:
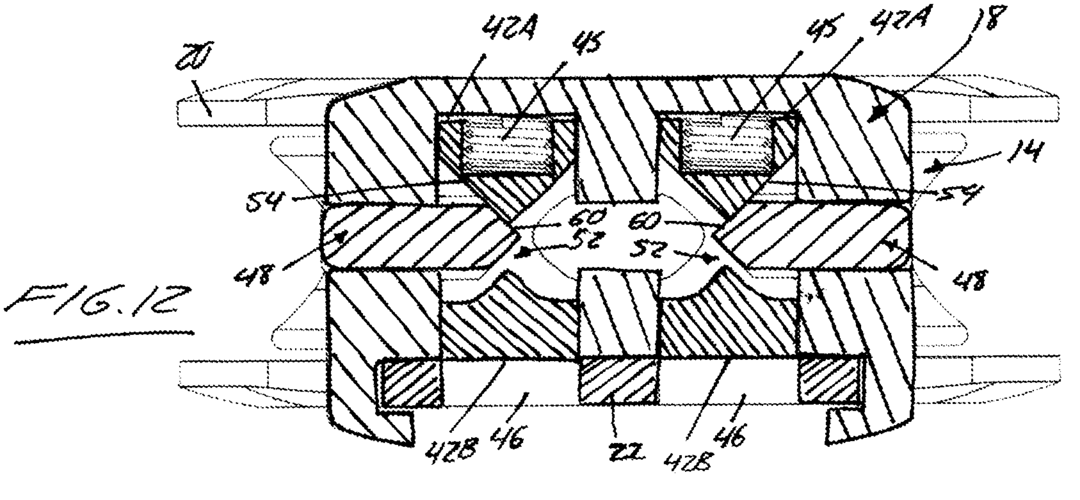
FIG. 12 is a cross-sectional view of the snatch block of FIG. 6, as viewed along line A-A thereof to illustrate a release position of the locking mechanism.
Figure 16:
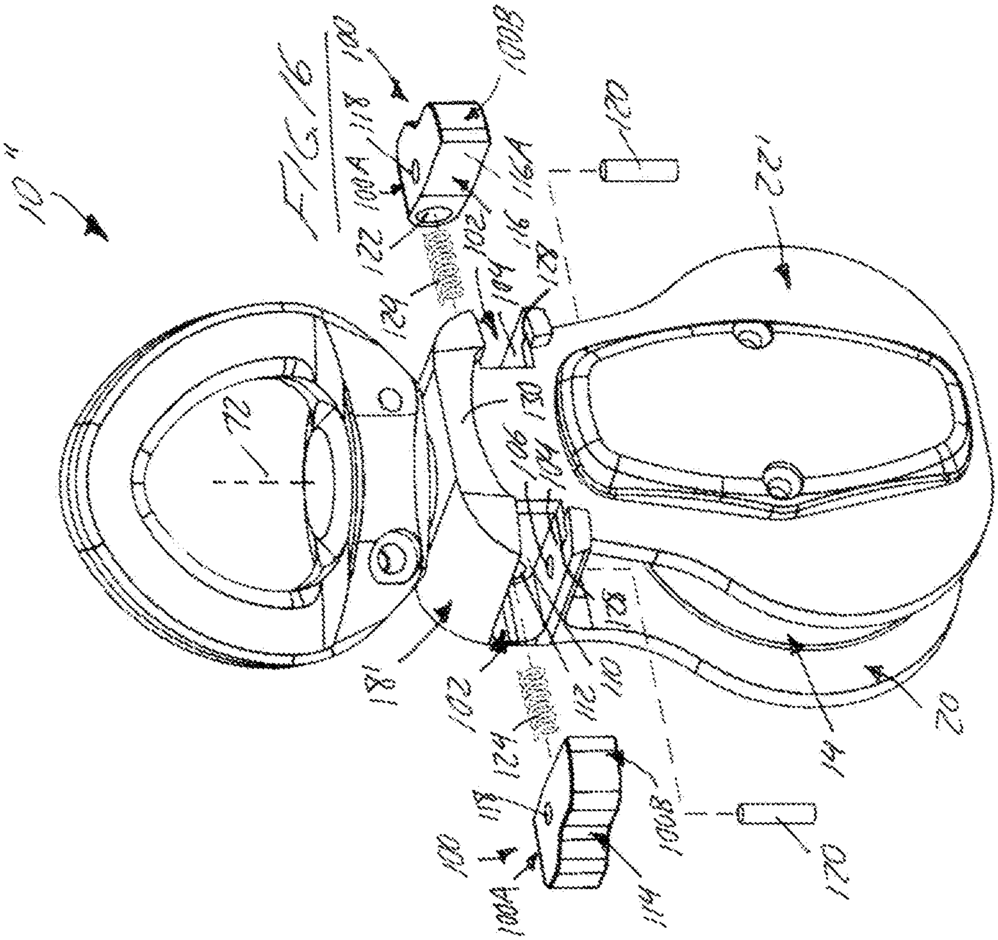
FIG. 16 is a partially exploded view of the snatch block of FIG. 15, illustrating a rocker arm locking mechanism thereof that replaces a slide latch locking mechanism of the first and second embodiments.

In FIGS. 1-4, 7-8 and 11, the plungers 48 are in their default ready positions, and the latch bolts 42 are accordingly in their default spring-biased locking positions. In FIGS. 5-6 and 12, the plungers 48 are in their manually depressed release positions, and the latch bolts 42 are accordingly in their retracted release positions. When the movable cheek plate 22 is closed and locked, as shown in FIGS. 1 through 4, unlocking of the movable cheek plate 22 to allow sliding thereof into the open position of FIGS. 7 and 8 requires that the user of the snatch block manually depress both of the two release plungers 48 in order to disengage both of the two latch bolts 42 from the movable cheek plate 22, whereupon the user can then manually slide the unlocked movable cheek plate 22 into the open position. These three actions (simultaneous depression of both release plungers 48, and sliding open of the movable cheek plate 22) can optionally be performed in a single-handed manner, for example by squeezing the two release plungers toward one another between the thumb and middle finger of one hand, and simultaneously pushing down on the terminal top edge 22A of the movable cheek plate 22 with the index finger of the same hand. Requiring physical user input on both release plungers 48 to release the spring-loaded auto-locking action on the closed movable cheek plate 22 helps prevent inadvertent opening of the snatch block, for example by inadvertent depression of one plunger 48 during grasping of the snatch block crown, or by impact of the snatch block crown against an object at one of the two plunger equipped lateral sides of the snatch block.

To prevent each release plunger 48 from sliding out of its respective plunger bore 50, an underside of each release plunger 48 has a recessed retention cavity 62 that spans a partial and intermediately located fraction of the plunger's length. This retention cavity 62 resides at area of the plunger 48 that resides inside the crown 18 of the snatch block, and that neighbours, but stops short of, the peaked working end of the plunger. Each plunger bore 50, near a bottom thereof, is perpendicularly intersected by a respective cross-bore 64 of notably lesser diameter than the plunger bore 50 itself. This cross-bore 64, one of which can be seen in FIG. 9, has a respective roll pin 66 frictionally anchored therein, whereby the roll pin 66 spans transversely across the respective release plunger 48 through the retention cavity 62 at the underside thereof. As a result, sliding displacement of the release plunger 48 in either direction in its respective plunger bore 50 is limited by eventual contact of the roll pin 66 with a respective end wall of the retention cavity 62.

The protective cover 24 shown in FIG. 1 is installed on the outer side of the movable cheek plate 22 in a position fully covering the entirety of the elongated slot 40, as well as the head 30B of the axle pin 30. The cover 24 thus conceals a potential pinching hazard that otherwise may exist between the axle pin 30 and ends of the slot 40 during sliding movement of the movable cheek plate 22. In the first illustrated embodiment, the protective cover 24 is attached to the movable cheek plate 22 in snap-fit fashion via snap-fit securement holes 68 therein, and corresponding snap-fit protuberances on an inner side of the cover.

Referring to the exploded view of FIG. 9, in addition to the novel slide-open cheek plate 22, the snatch block 10 also differs from conventional designs in the manner by which its swivel eye 16 is rotatably coupled to the crown 18 of the shell. Conventionally, the swivel eye is secured to the shell in rotatable fashion by a separate bolt that is engaged through a fastening hole in a base of the swivel eye 16 and through an aligned fastening hole that penetrates downwardly through the crown of the shell. The illustrated embodiments of the present invention do away with this separate bolt, and instead each employ a seamlessly integral stud 70 that projects outwardly from a topside of the crown 18.

The stud 70 projects upwardly from the crown 18 in a direction moving away from the swallow that is delimited beneath the opposing underside of the crown. Being a seamlessly integral part of a unitary piece of material that also defines the crown 18, and that preferably also defines the stationary first cheek plate 20, there's no risk of the stud 70 coming loose and separating from the crown. The integral stud 70 has a cylindrical shaft 70A and an enlarged head 70B. The shaft 70A projects from the topside of the crown and defines a stud axis 72 that lies perpendicular to the rotation axis $A_R$ of the sheave 14 and parallel to the slot axis $A_S$ of the movable cheek 22. The enlarged stud head 70B is integrally affixed to the stud shaft 70A at a distal end of thereof furthest from the crown 18. The stud head 70B is larger than the stud shaft 70A in their diametrical measure across the stud axis 72.

The swivel eye 16 is a two-piece assembly, composed of a main body 74 and a separate closure segment 76. The main body 74 has a lower base 78 and an upper loop 80. The lower base 78 is of generally U-shaped form spanning 180-degrees around the stud axis 72 in a plane lying perpendicular thereto, whereby the base 78 can embrace around the shaft 70A of the crown's integral stud 70 on three sides thereof. In a plane parallel to the stud axis 72, the upper loop 80 arches from one side of the U-shaped base 78 to the opposing side thereof in overlying relation thereto. The arch-shape of this upper loop 78 is bisected by the stud axis 72. During assembly of the snatch block 10', the U-shaped base 78 of the swivel eye 16 is placed in embracing relation around the shaft 70A of the crown's integral stud, and then the closure segment 76 is fastened or otherwise affixed to the two ends of the U-shaped base 78 in a position spanning between these two ends of its U-shaped at an open side thereof. Accordingly, the assembled base 78 and closure segment 76 cooperatively form a closed ring that encircles the full circumference of the stud shaft 70A. This closed ring is angularly rotatable around the stud axis, yet axially constrained between the enlarged head 70B of the stud 70 and the topside of the crown 18. The assembled multi-piece swivel eye 16 is thus secured to the crown 18 of the shell, but is capable of swiveling movement relative thereto around the stud axis 72. It will be appreciated that the novel use of an integrated stud 70 that is machined, forged, cast or otherwise integrally incorporated into the crown at the time of manufacture may be applied to a variety of snatch blocks, and not just those that also feature the novel sliding cheek plate 22 disclosed herein.

FIGS. 13 and 14 show a second embodiment of the snatch block 10' that is substantially similar to the first embodiment, except that the movable cheek plate 22 is spring-biased into the open position. This way, should the locking mechanism fail to properly latch the movable cheek 22 plate in the fully closed position during attempted closure by the user, the movable cheek plate is automatically forced back open via an applied spring force. The user's visual realization of the cheek plate's open position then serves as a visual notification of the failed closure and latching attempt, whereupon the user will attempt another closure of the snatch block until successful latching is achieved.

In the illustrated example, this spring loading of the movable cheek plate 22 is accomplished by replacing the protective cover 24 of the first embodiment with a track member 82 installed on the outer side of the movable cheek plate 22. The track member 82 has a central channel 84 delimited between two track bars 86 that run along the slot 40 in parallel and adjacent relation thereto on the outside of the movable cheek plate 22. The head 30B of the axle pin 30 has a push member 88 thereon that protrudes axially outward therefrom into the central channel 84 of the track member 82. A coiled compression spring 90 has a first end thereof abutted or affixed to a terminal end wall of the channel 84 that is furthest from the crown 18 of the shell. A second end of the spring 90 pushes directly or indirectly against the push block 84 of the axle pin, for example in indirect fashion via an end fitting 92 that is shown attached to this second end of the spring 30.

Manual user-driven movement of the cheek plate 22 toward the closed position thus compresses the spring 90, whereupon the spring's opposing ends will push oppositely against the terminal end of the track member channel 84 and the push member 88 of the axle pin 30. Accordingly, upon user-release of the movable cheek plate 22 anytime prior to a successful latching thereof by the locking mechanism, the movable cheek plate 22 will be spring biased back into its fully open position. Whereas the protective cover 24 in the first embodiment was mounted directly to the outer side of the movable cheek plate 22, the protective cover 24' in the second embodiment instead mounts to the track member 82 in overlying relation thereto at an outer side thereof opposite the movable cheek plate 22. The modified cover 24' thus fully conceals the track channel 84, the spring 90 and the push member 88, as well as the cheek plate slot 40 and engaged axle pin 30 that are situated behind the track member. The protective cover 24' therefore again serves to protect the user from any pinching hazards created by relative movement of components hidden behind the cover during sliding movement of the cheek plate 22.

It will be appreciated that the manner in which the movable cheek plate is spring biased into the open position may be varied from the particular example presented in the illustrated embodiment. It will also be appreciated that while the illustrated embodiments represent single-sheave snatch blocks, that multi-sheave snatch blocks having multiple sheaves may likewise benefit from the various novel snatch block features described herein.

FIGS. 15 through 18 illustrate a third embodiment of the snatch block 10", which differs from the preceding first and second embodiments specifically in terms of the locking mechanism by which the movable cheek plate 22' is automatically locked in the closed position once moved thereinto. Whereas the earlier embodiments featured a slide latch locking mechanism with two sliding latch bolts 42 that are constrained to linearly displaced movement and actuated by respective release plungers 48, the third embodiment instead features a rocker arm locking mechanism with two pivotably supported rocker arms 100 that replace both the latch bolts and the release plungers of the earlier embodiments. The two rocker arms 100 are respectively received in two hollow cavities 102 that are recessed into the two opposing lateral sides of the crown 18'. A floor 104 of each cavity has a penetrating lower pin hole 106 therein that penetrates downwardly through the floor of the cavity to the underside of the crown, and an opposing ceiling of each cavity 102 has a blind upper pin hole therein (not shown) that is aligned with the penetrating lower pin hole 106 on a shared axis therewith.

An intact central body 108 of the crown resides between the cavities 102, and defines a respective inner wall 110 of each cavity. From the inner wall 110 of each cavity 102, a respective blind spring bore 112 penetrates into the central body 108 of the crown 18' toward, but without reaching, the opposing cavity 102. The two spring bores 112 are aligned with one another on a shared axis, and are symmetrically disposed to one another across a midplane $P_B$ of the snatch block, in which both the stud axis 72 and rotation axis $A_R$ reside. Each spring bore 112 stops short of the snatch block midplane $P_B$, and terminates with a closed end wall 112A.

Each rocker arm 100 has an outer side 114 that faces laterally outward from the respective cavity 102 at an open side thereof that resides in opposing relation to the cavity's inner wall 110. An opposing inner side 116 of each rocker arm resides adjacent to, and faces toward, the cavity's inner wall 110. A pin bore 118 penetrates fully through each rocker arm 100 from a topside thereof to an opposing underside thereof, and aligns with the upper and lower pin holes in the ceiling and floor of the cavity 102. A respective pivot pin 120 is installed in the aligned pin holes of each cavity in a position passing through the aligned pin bore 118 of the respective rocker arm 100 The pivot pin 120 thereby defines a respective upright pivot axis about which the rocker arm 100 is pivotable. Each rocker arm 100 features a blind spring hole 122 penetrating thereinto from the inner side 116 thereof at a location near a rear end 100A of the rocker arm 100 (i.e. the end thereof nearest to the plane of the stationary cheek plate 20 at the rear side of the snatch block 10"). The open end of the spring hole 122 faces toward the open end of the spring bore 112 in the inner wall 110 of the respective cavity 102. At each cavity 102, the spring bore 112 and corresponding spring hole 122 cooperatively receive a respective compression spring 124 therein, whose opposing ends abut respectively against the closed ends of the spring bore 112 and corresponding spring hole 122. By way of this compression spring 124, the rear end 100A of each rocker arm 100 is thus biased outwardly away from the inner wall 110 of the respective cavity 102.

Figure 17:
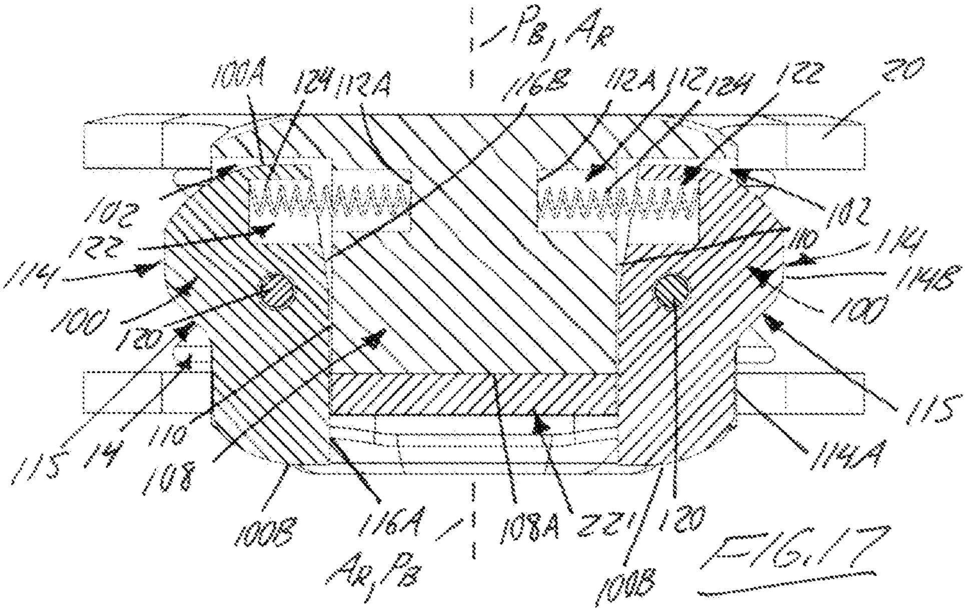
FIG. 17 is a cross-sectional view of the snatch block of FIG. 15 as viewed along line A-A thereof to further illustrate the rocker arm locking mechanism.

A front end 100B of each rocker arm 100 resides distally opposite the rear end 100A thereof. The rocker arm 100 is constrained to pivotal motion about its respective pivot pin 120, whereby the outward biasing of the rear end 100A of the rocker arm 100 by the compression spring 124 causes an inward biasing of the front end 100B of the rocker arm 100 toward the snatch block's midplane $P_B$. The inner side 116 of each rocker arm features different surfaces of non-parallel relation to one another: a front surface 116A located between the front end 110B of the rocker arm 100 and the pivot pin 120 thereof, and a rear surface 116B that is located between the rear 110B of the rocker arm and the pivot pin 120. It is in this rear surface 116B that the spring hole 122 is provided at a location rearward of the pivot pin 120. The compression springs 124 each bias the respective rocker arm 100 into a locking position, in which the front end 100B of the rocker arm resides at its closest possible position to the midplane $P_B$ of the snatch block 10". In this closed position, the front surface 116A of the rocker arm's inner side 116 abuts against the inner wall 110 of the respective cavity 102, as shown in FIG. 17. On the other hand, in this locking position, the non-parallel rear surface 116B of the rocker arm's inner side 116 angles outwardly and rearwardly away from the inner wall 110 of the respective cavity toward the plane of the stationary cheek plate 20.

Through manually exerted actuation directly on the rocker arm itself, rather than via a separate release plunger, each rocker arm 100 can be pivoted out of its locking position in a release direction moving the angled rear surface 116B of the rocker arm's inner side 116 toward the inner side 110 of the cavity, against the resistant force of the compression spring 124. This pivotal movement of each rocker arm 100 out of the locking position retracts the front end 100B of the rocker arm 100 further outwardly from the midplane $P_B$ of the snatch block 10". The range of such pivotal movement is limited by either maximum attainable compression of the compression spring 124, or eventual contact of the rocker arm's inner rear surface 1166 against the inner wall 110 of the cavity, or a combination thereof.

The outer sides 114 of the two rocker arms are beneficially shaped for optimal gripping thereof between the thumb and a finger (e.g. middle finger) of one hand for simultaneous actuation of the rocker arms in the release direction. For such purpose, a rear half 1146 of the outer side 114 of each rocker arm is of protrusively lobed relation to a front half 114A thereof. From the rear side of the snatch block 10", a user's thumb and finger can reach forwardly over the lobed rear halves 114B of the rocker arms 100 to grip the sloped front surfaces 115 of these rear lobes. Pulling rearward on these gripped front surfaces 115 of the lobes is operable to thereby squeezing the rear ends 100A of the two rocker arms 100 toward one another. This pivots the rocker arms 100 in the release direction about the parallel axes of their respective pivot pins 120, thereby causing outward movement of the front ends 100B of the rocker arms 100 away from the midplane $P_B$ of the snatch block 10". As described in more detail below, this is operable to disengage the rocker arms 100 from the closed movable cheek plate 22', thus unlocking same to allow movement thereof to the open position, of FIG. 18, which opens up front loading access to the swallow of the snatch block.

Figure 18:
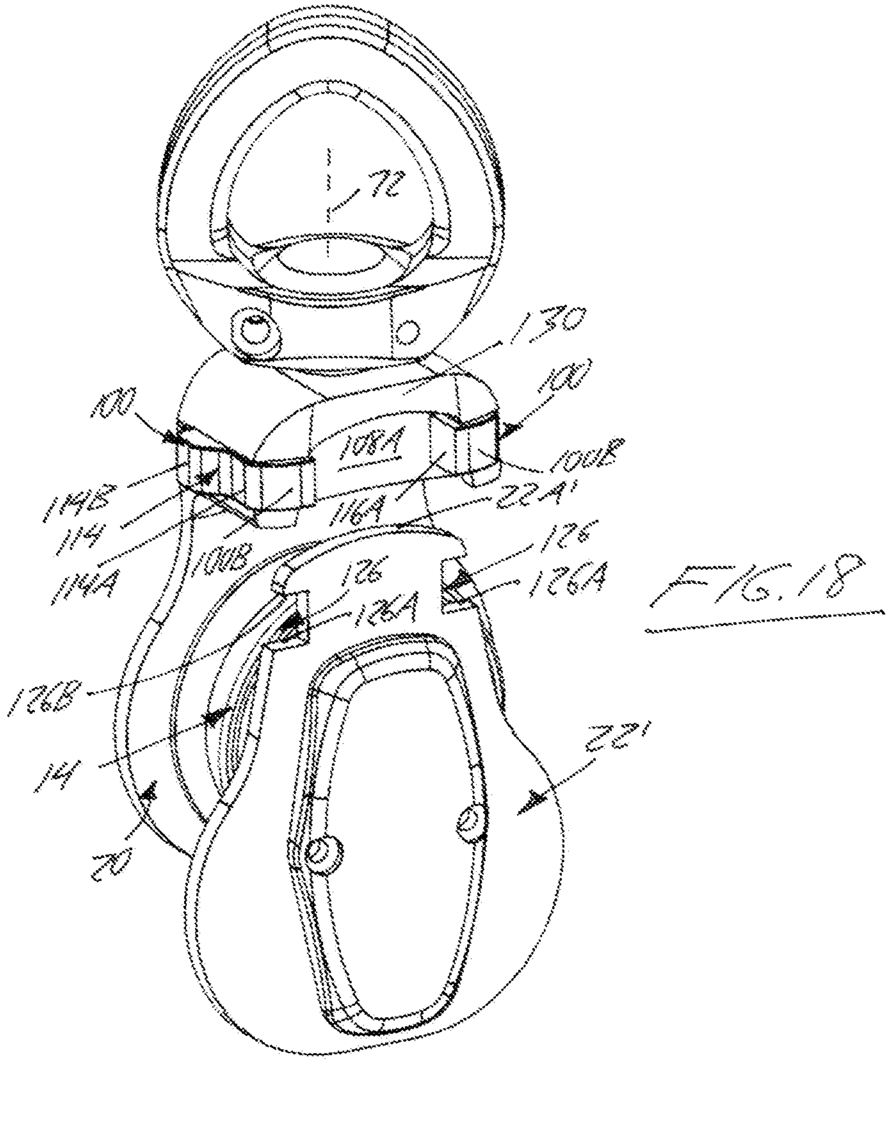
FIG. 18 is a front perspective view of the snatch block of FIG. 15 with the movable cheek plate thereof in the open position.

As best seen in FIG. 18, the movable cheek plate 22' of the third embodiment features a pair of latching notches 126 recessed into laterally opposing edges of the cheek plate 22' near the top end thereof. In the closed position of the movable cheek plate 22', these two notches 126 respectively coincide with the two cavities 102 in the crown 18". The floors of the cavities 104 have respective slots 128 therein (FIG. 16) that accommodate bottom shoulders 126A of the latching notches 126 of the movable cheek plate 22' in the closed position thereof. These slots 128 reside in front overhanging portions of the cavity floors 104 that project forwardly beyond the plane occupied by a front end 108A of the central body 108 situated between the two cavities. The ceilings of the two cavities 102 likewise have front overhanging portions that project forwardly beyond the plane of the central body's front end 108A. A central front overhang 130 of the crown 18' resides atop the central body 108, and likewise protrudes forwardly past the plane of the central body's front end 108A. This central front overhang 130 spans between, and thereby interconnects, the front overhanging portions of the two cavity ceilings.

The central front overhang 130 and the front overhanging portions of the cavity ceilings thus cooperatively form a collective front overhang the crown 18' that protrudes past the plane 108A of the central body's front end 108A. A receiving slot of conforming shape to the terminal supper edge 22A of the movable cheek plate 22' spans an underside of this collective overhang in order to receive the terminal upper edge 22A' of the movable cheek plate 22' in the closed position thereof. This mated relationship between the movable cheek plate's upper edge 22A' limits upward sliding of the movable cheek plate 22', thereby defining the properly closed position in which the latching notches 126 reside in coinciding alignment with the cavities 102.

With the movable cheek plate 22' in the closed position and the rocker arms 100 in their locking positions, a front latching portion 132 of each rocker arm, at or near the front end 1006 thereof, is engaged within the respective latching notch 126 at the respective lateral edge of the movable cheek plate 22'. In this locked state of the closed movable cheek plate 22, the top shoulders 1266 of the two latching notches 126 rest atop the rocker arms 100, which thereby block downward movement of the movable cheek plate 22' from the closed position of FIG. 15 18 into the open position of FIG. 18.

Figure 15:
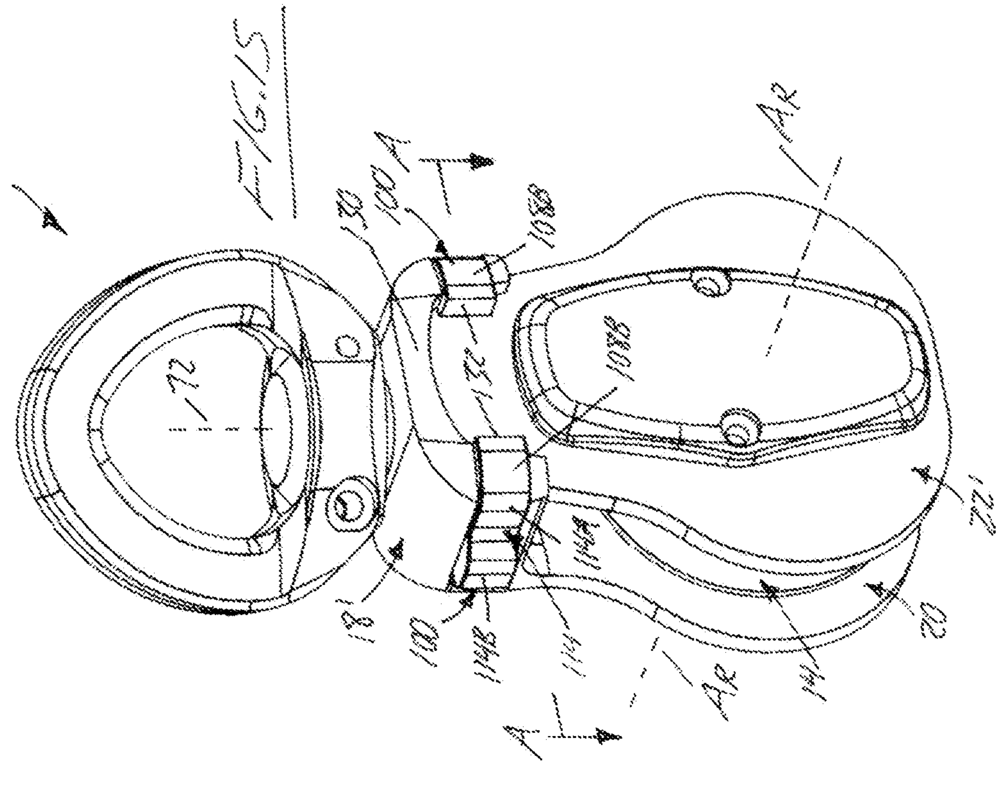
FIG. 15 is a front perspective view of a snatch block according to a third embodiment of the present invention, with the movable cheek plate thereof locked in the closed position.

In this embodiment, the terminal upper edge 22A' of the movable cheek plate 22' is convexly rounded, whereby during upward movement of the movable cheek plate 22' from the open position of FIG. 18 toward the closed position of FIG. 15, contact of the rounded upper edge 22A' of the cheek plate 22' against the undersides of the two spring-biased rocker arms 100 will force the rocker arms 100 out of their spring-biased locking positions, and into a more spread apart open state. This allows the top end 22A' of the movable cheek plate 22' to slide upwardly past the temporarily spread apart rocker arms 100, and into mated relation with the slotted underside of the crown's collective overhang. Once having cleared the top shoulders 126B of the latching notches 126, the rocker arms 100 will be spring biased back into their default locking positions inside the latching notches 126 of the now-closed movable cheek plate 22', thus automatically locking the movable cheek plate 22' in this closed position.

To unlock the closed movable cheek plate 22', the two rocker arms are gripped between the user's thumb and finger at the sloped front surfaces 115 at the lobed rear halves 114B thereof, and are manually actuated to squeeze the rear ends 100A of the rocker arms 100 toward one another. This pivotally moves the rocker arms 100 into their release positions, in which their front latching portions 132 are withdrawn from the latching notches 126 of the movable cheek plate 22', thereby enabling downwardly sliding thereof into the open position of FIG. 18, for example under the same spring loaded opening action described above for the second embodiment.

In summary of the third embodiment, the rocker arms 100, like the latch bolts 42 of the earlier embodiments, serve as spring-loaded latches normally biased into locking positions in which they engage with the movable spring cheek 22', whenever fully closed. However, instead of relying on separate release plungers 48 to actuate movement of the latches into their release positions disengaged from the movable cheek plate, the lobed rear halve 1146 of each rocker arms serves as a built-in manually actuable release by which the latched rocker arm is disengageable from the movable cheek plate 22' to enable the opening and loading of the snatch block 10". The rocker arm implementation reduces the number of moving parts relative to the earlier slide latch embodiments, but provides a similar functional result: a dual-release locking mechanism that automatically locks the movable check plate upon proper closing thereof, but requires simultaneous manual actuation at discretely separate locations on the snatch block to release the latched state, thus preventing inadvertent opening of the snatch block.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A snatch block comprising:

a stationary first cheek residing in a first plane on a first side of an internal space of the snatch block;

a movable second cheek residing in a second plane on an opposing second side of an internal space of the snatch block in spaced and opposing relation to said first cheek, said second cheek being slidable back and forth in said second plane between a closed position and an open position;

at least one sheave rotatably supported on said first and second cheeks in the internal space therebetween, and said sheave being rotatable around a rotation axis that transversely penetrates said first and second planes; and a crown attached to the stationary first cheek and jutting inwardly therefrom toward the second plane at a position spaced outwardly from a periphery of the sheave in a radial direction relative to said rotation axis, thereby delimiting a swallow that remains open between the sheave and the crown to accommodate passage of a rope therethrough;

wherein said movable second cheek is slidable, relative to the first cheek, and in linear fashion along an axis lying transversely of the rotation axis of the sheave, between the closed position, in which the movable second cheek connects with the crown and closes off the swallow at the second side of the interior space, and the open position, in which an access gap opens into the swallow between the movable second cheek and the crown at the second side of the interior space to enable loading of the rope into the swallow via said access gap.

2. The snatch block of claim 1 further comprising an axle that defines the rotation axis around which the sheave is rotatable, and wherein the movable second cheek has an elongated slot therein that lies transversely of the rotation axis, and through which said axle penetrates.

3. The snatch block of claim 2 comprising a protective cover overlying said elongated slot of the movable second cheek at an outer side thereof opposite the interior space of the snatch block.

4. The snatch block of claim 1 comprising a locking mechanism that is configured to normally lock the movable second cheek in the closed position, and that comprises at least one movable latch normally biased into a locking position engaged to the movable second cheek, and selectively movable into a release position disengaged from the movable second cheek.

5. The snatch block of claim 4 wherein the movable second cheek is spring biased into the open position, whereby upon any failed attempt to latch the movable second cheek in the closed position, the second cheek is automatically forced into the open position to provide a visual indication of said failure to latch.

6. The snatch block of claim 4 wherein the movable latch is a displaceable slide latch engaged by a respective depressible release plunger operable, when depressed, to displace the slide latch into the release position.

7. The snatch block of claim 4 wherein the movable latch is a pivotally supported rocker arm having a latching portion configured for engagement with the movable second cheek, and a release portion operable, when manually actuated, to pivot said rocker arm in a direction disengaging the latching portion thereof from the movable second cheek.

8. The snatch block of claim 1 comprising a dual-release locking mechanism that is configured to normally lock the movable second cheek in the closed position, and that comprises two separately actuated releases residing at discretely separate locations on the snatch block and requiring physical exertion of separate actuation forces thereon to release said dual-release locking mechanism.

9. The snatch block of claim 1 wherein the movable second cheek is spring biased into the open position.

10. The snatch block of claim 1 further comprising a locking mechanism arranged to normally latch the movable second cheek when placed in the closed position, and wherein the movable second cheek is spring biased into the open position, whereby upon any failed attempt to latch the movable second cheek in the closed position, the second cheek is automatically forced into the open position to provide a visual indication of said failure to latch.

11. The snatch block of claim 1 wherein the crown comprises a seamlessly integral stud protruding therefrom at a topside thereof that resides opposite the swallow, and a swivel eye is rotatably coupled to said stud for swivelling movement around a stud axis thereof.

12. A snatch block comprising:

a first stationary cheek residing in a first plane on a first side of an internal space of the snatch block;

a movable second cheek residing in a second plane on an opposing second side of an internal space of the snatch block in spaced and opposing relation to said stationary first cheek, said movable second cheek being movable between a closed position and an open position;

at least one sheave rotatably supported on said first and second cheeks in the internal space therebetween, and said sheave being rotatable around a rotation axis that transversely penetrates said first and second planes; and a crown residing at a position spaced outwardly from a periphery of the sheave in a radial direction relative to said rotation axis, thereby delimiting a swallow that remains open between the sheave and the crown to accommodate passage of a rope therethrough, wherein:

said movable second cheek is movable, relative to the stationary first cheek, between the closed position, in which the movable second cheek closes off the swallow at the second side of the interior space, and the open position, in which an access gap opens into the swallow to enable loading of the rope into the swallow via said access gap; and a dual-release locking mechanism that is configured to normally lock the movable second cheek in the closed position, and comprises two separate locking members of independently movable relation to one another between respective locking and release positions, and respectively associated with two separately actuated releases that reside at discretely separate locations on the snatch block and require physical exertion of separate actuation forces thereon to respectively release the two separate locking members of said dual-release locking mechanism.

13. The snatch block of claim 12 wherein said two separately actuated releases reside at opposing sides of the crown.

14. The snatch block of claim 13 wherein said opposing sides of the crown oppose one another in a lateral direction that is perpendicular to a direction in which the first and second cheeks oppose one another, and perpendicular to the rotation axis.

15. The snatch block of claim 12 wherein the two separate locking members comprises two slidable latches, and each release comprises a depressible release plunger respectively engaged with one of said slidable latches, being each of which is normally biased into engagement with the movable second cheek to achieve the respective locking position, and each of which is selectively displaceable into the respective release position disengaged from the movable second cheek upon depression of the respective release plunger.

16. The snatch block of claim 15 wherein each release plunger and the respective slidable latch are displaceable on respective axes of transverse relationship to one another, and are slidably interfaced with one another at respective contact surfaces of obliquely oriented relationship to both of their respective axes.

17. The snatch block of claim 12 wherein the two separate locking members comprises two rocker arms, and each release is embodied by a release portion of a respective one of said rocker arms, each of which also has a latching portion configured for engagement with the movable second cheek, and manual actuation of said release portion of each rocker arm is operable to pivot said rocker arm in a direction disengaging the latching portion thereof from the movable second cheek.

18. The snatch block of claim 12 wherein the movable second cheek is spring biased into the open position, whereby upon any failed attempt to latch the movable second cheek in the closed position, the second cheek is automatically forced into the open position to provide a visual indication of said failure to latch.

19. A device comprising:

a first cheek residing in a first plane on a first side of an internal space of the device through which routing of a rope is accommodated;

a second cheek residing in spaced and opposing relation to the first cheek in a second plane residing across the internal space therefrom;

a crown attached to at least one of the cheeks and jutting therefrom toward the other cheek at a position crowning said internal space;

a seamlessly integral stud protruding from the crown at a topside thereof that faces outwardly away from the internal space; and a swivel eye rotatably coupled to said stud for swivelling movement around a stud axis thereof.

20. A snatch block comprising:

a first stationary cheek residing in a first plane on a first side of an internal space of the snatch block;

a movable second cheek residing in a second plane on an opposing second side of an internal space of the snatch block in spaced and opposing relation to said stationary first cheek, said movable second cheek being movable between a closed position and an open position;

at least one sheave rotatably supported on said first and second cheeks in the internal space therebetween, and said sheave being rotatable around a rotation axis that transversely penetrates said first and second planes; and a crown residing at a position spaced outwardly from a periphery of the sheave in a radial direction relative to said rotation axis, thereby delimiting a swallow that remains open between the sheave and the crown to accommodate passage of a rope therethrough;

wherein the movable second cheek is spring biased into the open position and is linearly slidable between said open and closed positions along an axis lying transversely of the rotation axis of the sheave.

21. The snatch block of claim 20 further comprising a locking mechanism arranged to normally latch the movable second cheek when placed in the closed position, whereby upon any failed attempt to latch the movable second cheek in the closed position, the second cheek is automatically forced into the open position to provide a visual indication of said failure to latch.

* * * * *